US012578034B2

(12) United States Patent　　　(10) Patent No.:　US 12,578,034 B2

Nakayama et al.　　　　　　　(45) Date of Patent:　Mar. 17, 2026

---

(54) VACUUM PRESSURE CONTROL SYSTEM

(71) Applicant: CKD CORPORATION, Komaki (JP)

(72) Inventors: Kyouta Nakayama, Komaki (JP);
　　　　　　Tetsujiro Kono, New Taipei City (TW)

(73) Assignee: CKD CORPORATION, Komaki (JP)

( * ) Notice:　Subject to any disclaimer, the term of this
　　　　　　patent is extended or adjusted under 35
　　　　　　U.S.C. 154(b) by 0 days.

(21) Appl. No.: 18/823,901

(22) Filed:　Sep. 4, 2024

(65)　　　　Prior Publication Data

US 2025/0084932 A1　Mar. 13, 2025

(30)　　　Foreign Application Priority Data

Sep. 13, 2023　(JP) ................................ 2023-148581

(51) Int. Cl.
　　*F16K 51/02*　　　(2006.01)
　　*F16K 37/00*　　　(2006.01)
(52) U.S. Cl.
　　CPC .......... *F16K 51/02* (2013.01); *F16K 37/0025*
　　　　(2013.01); *F16K 37/0033* (2013.01); *F16K*
　　　　*37/0041* (2013.01); *F16K 37/005* (2013.01);
　　　　　　　　　　　　　*F16K 37/0058* (2013.01)
(58) Field of Classification Search
　　CPC ............. F16K 37/0025; F16K 37/0033; F16K
　　　　　　37/0041; F16K 37/0058; F16K 37/005;
　　　　　　　　　　　　　　　　　F16K 51/02
　　See application file for complete search history.

(56)　　　　References Cited

U.S. PATENT DOCUMENTS

| | | | | |
|---|---|---|---|---|
| 5,586,576 A | * | 12/1996 | Franke .................... | F16K 37/00 |
| | | | | 137/559 |
| 2017/0184215 A1 | * | 6/2017 | Junk ........................ | F15B 20/00 |
| 2021/0180599 A1 | * | 6/2021 | Hayase ................... | F04C 28/24 |

FOREIGN PATENT DOCUMENTS

JP　　　　2021-093055 A　　6/2021

* cited by examiner

*Primary Examiner* — Atif H Chaudry
(74) *Attorney, Agent, or Firm* — Oliff PLC

(57)　　　　ABSTRACT

A vacuum open-close valve includes a drive unit for driving
a valve element based on an opening-degree command
value. The drive unit includes a drive shaft connected to the
valve element, a piston connected to the drive shaft at an
opposite end from the valve element, a cylinder provided
with a piston chamber housing the piston, and a bellofram
that is retained by the piston and partitions the piston
chamber. A controller is provided with an abnormality
detection program configured to calculate an opening-de-
gree difference between an opening-degree command value
outputted to the vacuum open-close valve and an actual
opening degree of the valve element driven by the opening-
degree command value, and determine that the bellofram is
damaged when the opening-degree difference is a first
predetermined threshold value or more.

12 Claims, 5 Drawing Sheets

FIG. 3

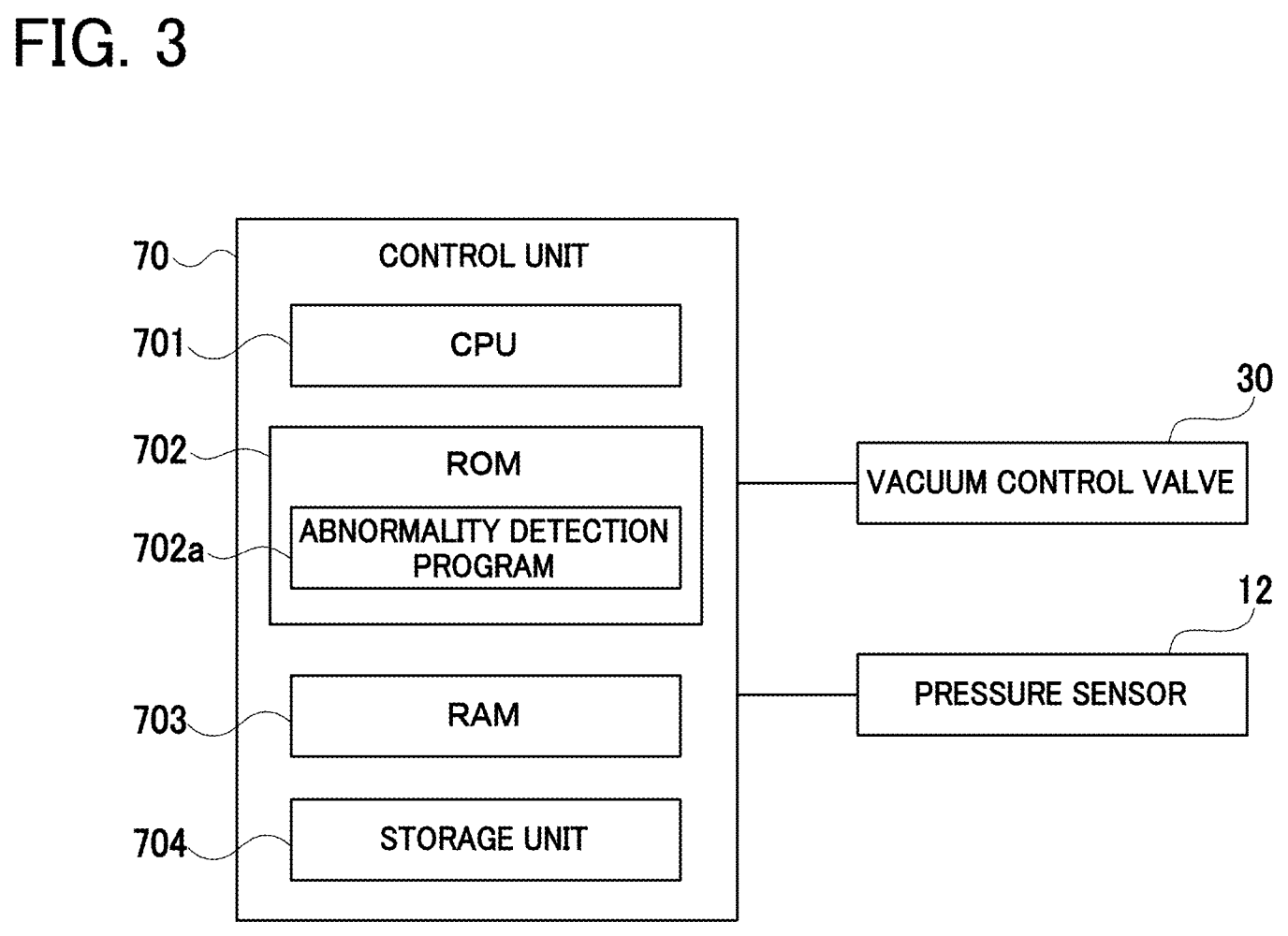

VACUUM CONTROL VALVE — 30

PRESSURE SENSOR — 12

CONTROL UNIT — 70

CPU — 701

ROM — 702

ABNORMALITY DETECTION PROGRAM — 702a

RAM — 703

STORAGE UNIT — 704

START

MONITOR PRESSURE VALUE — S1

DOES PRESSURE VALUE EXCEED THRETHOLD VALUE? — S2

YES

OBTAIN OPENING DEGREE — S4

IS THERE A DIFFERENCE BETWEEN OPENING-DEGREE COMMAND VALUE AND ACTUAL OPENING DEGREE? — S5

YES

DETERMINE ABNORMALITY — S6

NO

FEEDBACK CONTROL — S3

NO

VACUUM PRESSURE CONTROL SYSTEM

CROSS-REFERENCE TO RELATED APPLICATIONS

This application is based upon and claims the benefit of priority to Japanese Patent Application No. 2023-148581 filed on Sep. 13, 2023, the entire contents of which are incorporated herein by reference.

BACKGROUND

Technical Field

The disclosure relates to a vacuum pressure control system including a vacuum open-close valve that is placed between a vacuum chamber and a vacuum pump for exhausting gas from the vacuum chamber and configured to control the pressure value in the vacuum chamber by adjusting the opening degree of a valve element, and a controller that outputs an opening-degree command value to the vacuum open-close valve to command an opening degree required to adjust the pressure value to a target value.

Related Art

Heretofore, in a deposition process of a semiconductor manufacturing operation, the internal pressure of a vacuum chamber is reduced by a vacuum pump, and process gas is supplied onto a wafer fixed in the vacuum chamber. At that time, a vacuum pressure control system is used to adjust and maintain the pressure value in the vacuum chamber to a pressure value suitable for the deposition conditions. The vacuum pressure control system is provided, for example, with a vacuum open-close valve placed between the vacuum chamber and the vacuum pump and a controller for controlling the vacuum open-close valve.

The vacuum open-close valve is provided with a valve element and a valve seat which the valve element contacts with or separates from, and configured to adjust the distance of the valve element from the valve seat, that is, the opening degree. Further, the vacuum open-close valve includes a drive unit for providing driving force to the valve element. The drive unit is an air-cylinder which is operated pneumatically and is provided with a drive shaft connected to the valve element, a piston connected to the drive shaft on an opposite side from the valve element, a cylinder having a piston chamber in which the piston is housed, a thin-film-shaped bellofram retained by the piston and partitions the piston chamber, and a compression coil spring that urges the piston in a valve closing direction. The piston is slidable in the valve opening direction and the valve closing direction within the piston chamber. When compressed air is supplied to the drive unit, the piston is moved in the valve opening direction, thereby separating the valve element from the valve seat. In contrast, when supply of the compressed air is stopped, the piston is moved in the valve closing direction by the compression coil spring, allowing the valve element to contact with the valve seat.

The controller outputs an opening-degree command value to the vacuum open-close valve. This opening-degree command value is to command the vacuum open-close valve to open at the opening degree required to adjust the pressure value in the vacuum chamber to a target value. Upon receipt of this output of the opening-degree command value, the vacuum open-close valve adjusts its opening degree according to the opening-degree command value. One example of the vacuum pressure control system configured as above is disclosed in Japanese unexamined patent application publication No. 2021-093055 (JP2021-093055A).

SUMMARY

Technical Problems

The bellofram in the drive unit of the vacuum open-close valve is deeply folded back in the cylinder and will be deformed in association with the movement of the piston. At that time, the bellofram and the piston may rub against each other or the folded portions of the bellofram may rub against each other. Therefore, repeated operations of the drive unit may cause the bellofram to be damaged, e.g., to be torn or broken.

If the bellofram is torn or broken, the piston chamber does not keep its airtightness, resulting in leakage of operating air, and thus the piston cannot move accurately. That is, the opening degree according to the opening-degree command value cannot be obtained accurately. This vacuum open-close valve cannot control the pressure value in the vacuum chamber to a target value, which may cause semiconductor manufacturing defects.

The present disclosure has been made to address the above problems and has a purpose to provide a vacuum pressure control system capable of detecting damages to a bellofram used in a vacuum open-close valve.

Means of Solving the Problems

To achieve the above-mentioned purpose, one aspect of the present disclosure provides a vacuum pressure control system configured as below.

(1) In the vacuum pressure control system, a vacuum pressure control system comprising: a vacuum open-close valve placed between a vacuum chamber and a vacuum pump for exhausting gas from the vacuum chamber, and provided with a valve element and a valve seat which the valve element contacts with or separates from, the vacuum open-close valve being configured to control a pressure value in the vacuum chamber by adjusting an opening degree of the valve element; and a controller configured to output an opening-degree command value to the vacuum open-close valve to command the opening degree required to adjust the pressure value to a target value, wherein the vacuum open-close valve includes a drive unit that provides driving force to the valve element based on the opening-degree command value, the drive unit includes: a drive shaft connected to the valve element; a piston connected to the drive shaft on an opposite side from the valve element; a cylinder provided with a piston chamber in which the piston is housed; and a bellofram that is retained by the piston to partition the piston chamber, the controller is provided with an abnormality detection program configured to: calculate an opening degree difference, which is a difference between the opening-degree command value outputted to the vacuum open-close valve and an actual opening degree of the valve element driven by the opening-degree command value; and determine that the bellofram is damaged when the opening-degree difference is a first predetermined threshold value or more. Herein, damage to the bellofram means, for example, that the bellofram is torn or broken and could no longer keep the piston chamber airtight.

The inventors of the present application focused on that, if a bellofram is damaged, which cannot keep the airtightness of the piston chamber, the piston is not moved sufficiently and thus the actual opening degree is apt to be smaller than a target opening degree, i.e., an opening degree indicated by the opening-degree command value. Consequently, the inventors experimentally confirmed that whether or not the bellofram is damaged can be determined by calculating an opening degree difference between the opening-degree command value and the actual opening degree, and monitoring the opening degree difference. To be specific, it is possible to determine that the bellofram is damaged when the opening-degree difference is equal to or larger than the predetermined threshold value. Thus, according to the vacuum pressure control system described in (1), the controller is provided with the abnormality detection program configured to calculate the opening-degree difference between the opening degree command value outputted to the vacuum open-close valve and the actual opening degree of the valve element driven by the opening-degree command value, and determine that the bellofram is damaged when the opening-degree difference is equal to or larger than the first predetermined threshold value. This configuration can detect the damage, or abnormality, of the bellofram used in the vacuum open-close valve.

(2) In the vacuum pressure control system described in (1), the first predetermined threshold value may be set in a range of 0.5% to 2.0%.

The inventors experimentally confirmed that, when the first predetermined threshold value is set in a range of 0.5% or more but 2.0% or less, it is possible to detect damage to the bellofram more reliably. This is because false detection increases if the first predetermined threshold value is set smaller than 0.5%, while the bellofram damage is not detected quickly if the first predetermined threshold value is set larger than 2.0%.

(3) In the vacuum pressure control system described in (1) or (2), the abnormality detection program may be configured to: calculate the opening degree difference at intervals of 1 second; and determine that the bellofram is damaged when the opening degree difference is the first predetermined threshold value or more for three or more consecutive times.

In a vacuum open-close valve, if hunting occurs, which causes fluctuations in the opening degree of the valve element, the difference between the opening-degree command value and the actual opening degree may increase suddenly. If the bellofram is determined to be damaged in every case where the opening-degree difference is the first predetermined threshold value or more, this may result in a false detection that the bellofram is damaged, even if this bellofram is not actually damaged. According to the vacuum pressure control system described in (3), while comparing between the opening-degree command value and the actual opening degree at 1-second intervals, the bellofram is determined to be damaged when the difference is equal to or larger than the first predetermined threshold value for three or more consecutive times. This can avoid false detection. This condition, "three or more consecutive times" is set because the condition "two consecutive times" may cause false detection due to hunting.

(4) In the vacuum pressure control system described in any one of (1) to (3), the abnormality detection program may calculate the opening degree difference when the pressure value in the vacuum chamber exceeds a second predetermined threshold value.

(5) In the vacuum pressure control system described in (4), the second predetermined threshold value may be obtained by adding a value of 0.2% to 1% of the target value to the target value.

In the vacuum open-close valve, if hunting occurs, which causes fluctuations in the opening degree of the valve element, the difference between the opening-degree command value and the actual opening degree may increase suddenly. If the bellofram is determined to be damaged in every case where the opening-degree difference is the first predetermined threshold value or more, this may result in false detection that the bellofram is damaged, even if this bellofram is not damaged actually. Then, the inventors focused on that if the bellofram is damaged and the actual opening degree is smaller than the target value, which is the opening degree indicated by the opening-degree command value, gas exhaust from the vacuum chamber is not sufficiently performed, and the pressure value in the vacuum chamber rises with time. The inventors therefore experimentally confirmed that false detection can be suppressed by starting the calculation of the opening-degree difference when the pressure value in the vacuum chamber exceeds the second predetermined threshold value. This second predetermined threshold value is obtained by for example adding a value of 0.2% or larger but 1% or less, i.e., 0.2% to 1%, of the target value to the target value. This setting "0.2% to 1%" is because a threshold value obtained by adding a value smaller than 0.2% of the target value to the target value cannot reliably prevent false detection, while a threshold value obtained by adding a value larger than 1% of the target value to the target value cannot quickly detect the bellofram damage.

Advantageous Effects

The vacuum pressure control system of the disclosure can detect damage to a bellofram used in a vacuum open-close valve.

BRIEF DESCRIPTION OF THE DRAWINGS

FIG. 3 is a block diagram showing the configuration of a controller used in a vacuum pressure control system in the present embodiment;

DETAILED DESCRIPTION OF THE EXEMPLARY EMBODIMENTS

A detailed description of an embodiment of a vacuum pressure control system 1 of this disclosure will now be given referring to the accompanying drawings. The drawings used for explanation are simplified for convenience and do not represent the shapes, dimensions, and others accurately.

Configuration of Semiconductor Manufacturing Device

Figure 1:
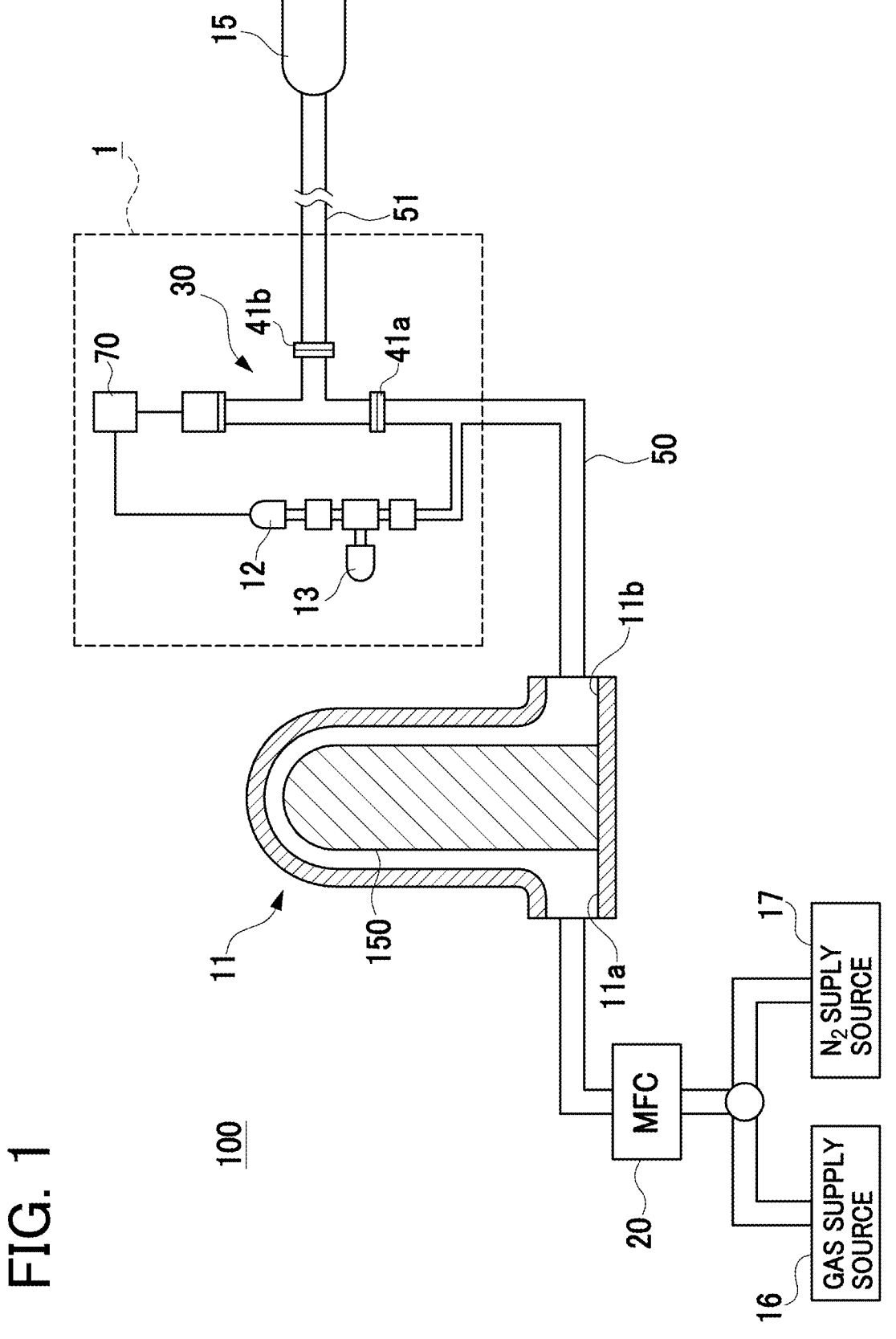
FIG. 1 is a diagram schematically showing the configuration of a semiconductor manufacturing device that performs a deposition treatment on wafers.

The configuration of the vacuum pressure control system 1 in this embodiment will be described, referring to the drawings. FIG. 1 is a diagram schematically showing the configuration of a semiconductor manufacturing device 100 for performing a deposition treatment on wafers 150. This semiconductor manufacturing device 100 is configured for example to deposit a thin film on the surface of each wafer 150 using for example Atomic Layer Deposition (ALD) method.

The semiconductor manufacturing device 100 mainly consists of a gas supply source 16 for supplying process gas to be used for surface treatment on a wafer 150, a $N_2$ supply source 17 for supplying nitrogen gas ($N_2$) to be used for purging the process gas from the vacuum chamber 11, a mass flow controller (MFC) 20 for controlling a flow rate of the process gas or $N_2$ gas, the vacuum chamber 11 which is a vacuum container, a vacuum pump 15 to be used for exhausting gas from the vacuum chamber 11, and the vacuum pressure control system 1 for controlling the pressure value in the vacuum chamber 11. Further, the vacuum pressure control system 1 mainly includes a vacuum open-close valve 30, a pressure sensor 12 for detecting the pressure value in the vacuum chamber 11, and a controller 70 for controlling the vacuum open-close valve 30.

The configuration of the semiconductor manufacturing device 100 will be described in detail below. As shown in FIG. 1, the gas supply source 16, mass flow controller 20, vacuum chamber 11, vacuum open-close valve 30, and vacuum pump 15 are connected in series in this order from the upstream side. To the upstream side of the mass flow controller 20, the $N_2$ supply source 17 is connected in parallel with the gas supply source 16. The pressure sensor 12 is located between the vacuum chamber 11 and the vacuum open-close valve 30 via a shut-off valve 13. The controller 70 is electrically connected to the pressure sensor 12 and the vacuum open-close valve 30.

The process gas supplied from the gas supply source 16 or the purge gas supplied from the $N_2$ supply source 17 is regulated to a predetermined flow rate by the mass flow controller 20 and then supplied to the vacuum chamber 11 through a gas inlet 11a. The predetermined flow rate of the process gas is a flow rate for actually controlling the internal pressure of the vacuum chamber 11 and indicates the flow rate of process gas required for the deposition treatment on the wafers 150. A gas outlet 11b of the vacuum chamber 11 is connected to a first port 41a of the vacuum open-close valve 30 through a pipe 50, while a second port 41b of the vacuum open-close valve 30 is connected to a vacuum pump 15 through a pipe 51. Thus, the vacuum pump 15 can suck the process gas or purge gas to be supplied to the vacuum chamber 11.

At that time, the controller 70 controls the opening degree of the vacuum open-close valve 30 so that the pressure value in the vacuum chamber 11 reaches a target value while monitoring the pressure value in the vacuum chamber 11 via the pressure sensor 12. To be specific, the controller 70 outputs an opening-degree command value to the vacuum open-close valve 30 to indicate the opening degree of the vacuum open-close valve 30 required to adjust the pressure value in the vacuum chamber 11 to the target value. The vacuum open-close valve 30 then adjusts the opening degree of a valve element 40 based on the opening-degree command value. Thus, the pressure value in the vacuum chamber 11 is adjusted to the target value.

Configuration of Vacuum Open-Close Valve

Figure 2:
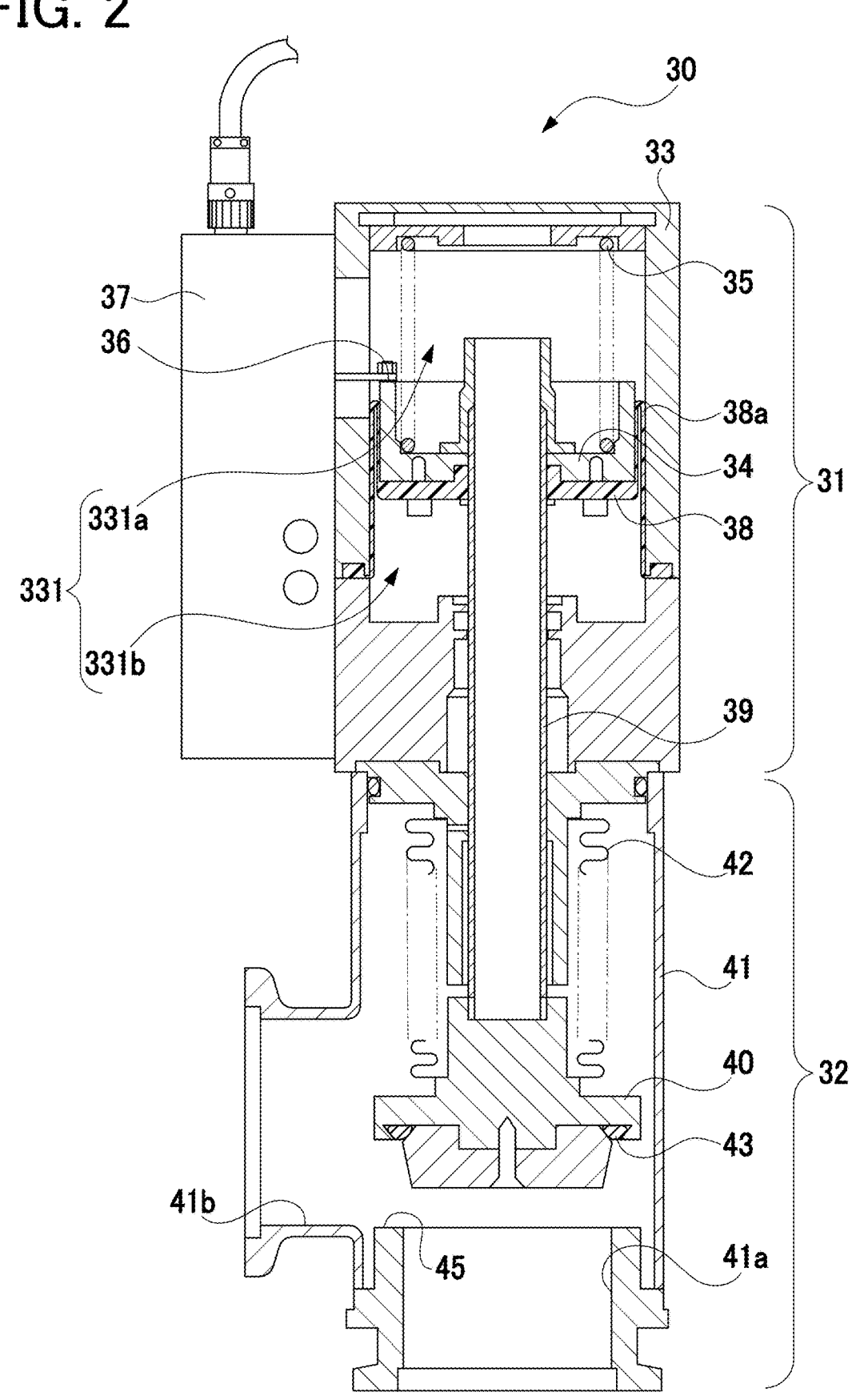
FIG. 2 is a cross-sectional view of a vacuum open-close valve, showing a state where the opening degree of a valve element is maximum.

FIG. 2 is a cross-sectional view of the vacuum open-close valve 30, showing a state where the opening degree of the valve element 40 is maximum. The vacuum open-close valve 30 includes a drive unit 31 and a valve unit 32, which are assembled vertically in FIG. 2.

The drive unit 31 mainly consists of a cylinder 33, a piston 34, a bellofram 38, and a drive shaft 39. The cylinder 33 is a hollow case, having a piston chamber 331 which is the nearly cylindrical internal space. In the piston chamber 331, the piston 34 is accommodated slidably in a direction parallel to the stacking direction of the drive unit 31 and the valve unit 32, that is, in an up-down direction.

A slide lever 36 is fixed to an end face of the piston 34, opposite the valve unit 32, i.e., an upper end face in FIG. 2. Further, a potentiometer 37 serving as an opening degree sensor is installed on the outside of the cylinder 33. This potentiometer 37 includes a built-in variable resistance (not shown) connected to the slide lever 36. As the slide lever 36 moves up and down together with the piston 34, the variable resistance value varies. This resistance value is outputted by the potentiometer 37 to the controller 70 as a value correlated to the vertical position of the piston 34. This enables the controller 70 to monitor the opening degree of the vacuum open-close valve 30. The controller 70 thus adjusts the opening-degree command value to be outputted to the vacuum open-close valve 30 while monitoring the opening degree of the vacuum open-close valve 30.

The bellofram 38 is fixed to an end face of the piston 34 on the valve unit 32 side, i.e., a lower end face in FIG. 2. The bellofram 38 is for example a bottomed cylindrical diaphragm formed of a base fabric made of polyester, polyamide, aramid, etc., and integrally coated with fluorine-contained rubber (e.g., FKM). The central portion of this bellofram 38 is secured to the lower end face of the piston 34. This bellofram 38 includes a folded portion 38a having an outer circumferential edge fixed to the cylinder 33 and being folded deeply upward in FIG. 2 between the outer peripheral surface of the piston 34 and the inner peripheral surface piston chamber 331. The bellofram 38 configured as above can be deformed to follow the sliding of the piston 34 in the up/down direction in FIG. 2. During this deformation, the bellofram 38 may rub against the piston 34 or some portions of the folded portion 38a of the bellofram 38 may rub against each other. Therefore, repeated deformation may cause the bellofram 38 to be damaged, e.g., torn. The folded portion 38a is particularly likely to be damaged because its thickness is as thin as several millimeters, compared to other portions. An abnormality detection program 702a mentioned later can detect such a damage.

The piston chamber 331 is partitioned by the bellofram 38 into a pressure chamber 331b located close to the valve unit 32 and an atmospheric air chamber 331a opposite the pressure chamber 331b. The atmospheric air chamber 331a receives atmospheric air introduced through an atmospheric-air port not shown. Further, the atmospheric air chamber 331a houses therein a return spring 35 that urges the piston 34 toward the valve unit 32, i.e., downward in FIG. 2. The pressure chamber 331b receives compressed air introduced from an air supply source not shown through a pressure port not shown. When the compressed air is introduced into the pressure chamber 331b, the bellofram 38 is subjected to the pressure of the compressed air, causing the piston 34 to slide toward the atmospheric air chamber 331a. In this embodiment, the bellofram 38 is configured such that its effective pressure-receiving area subjected to the compressed air is maintained constant and unchanged.

The piston 34 is connected, at its central portion, with the drive shaft 39 extending into the valve unit 32. The valve unit 32 is provided with the drive shaft 39, the valve element 40, and a casing 41 in which the drive shaft 39 and the valve element 40 are housed. The valve element 40 is connected to an end of the drive shaft 39, opposite the end connected to the piston 34, that is, an end inserted in the valve unit 32. The casing 41 is cylindrical and has the first port 41*a* and the second port 41*b*. A bellows 42 is provided on the upper surface of the valve element 40. The bellows 42 is placed enclosing the drive shaft 39.

The valve element 40 is attached, on its lower surface, with an O-ring 43. The valve element 40 is further formed, on the outer circumferential side of the first port 41*a*, with a valve seat 45 which the valve element 40 contacts with or separates from. When the valve element 40 moves to and contacts with the valve seat 45, and the O-ring 43 is pressed between the valve element 40 and the valve seat 45, that is, when the vacuum open-close valve 30 is fully closed, the flow of process gas is shut off.

Up/down movement of the piston 34 causes the valve element 40 to move up/down via the drive shaft 39, thereby changing the opening degree of the vacuum open-close valve 30. The potentiometer 37 measures the position of the piston 34 in the vertical direction, hence the position of the valve element 40 in the vertical direction, that is, the opening degree of the vacuum open-close valve 30, and transmits the measured value to the controller 70.

Controller

FIG. 3 is a block diagram showing the configuration of the controller 70 used in the vacuum pressure control system 1 in the embodiment. The controller 70 is provided with a CPU 701, a ROM 702, a RAM 703, and a storage unit 704 as shown FIG. 3. The ROM 702 stores the abnormality detection program 702*a* for detecting the abnormality in the vacuum open-close valve 30. The CPU 701 controls the operations of the vacuum open-close valve 30 based on the abnormality detection program 702*a* while temporarily storing data in the RAM 703. The storage unit 704 can store operation history, operation results, and others of the abnormality detection program 702*a*.

Operations of Vacuum Pressure Control System

Figure 4:
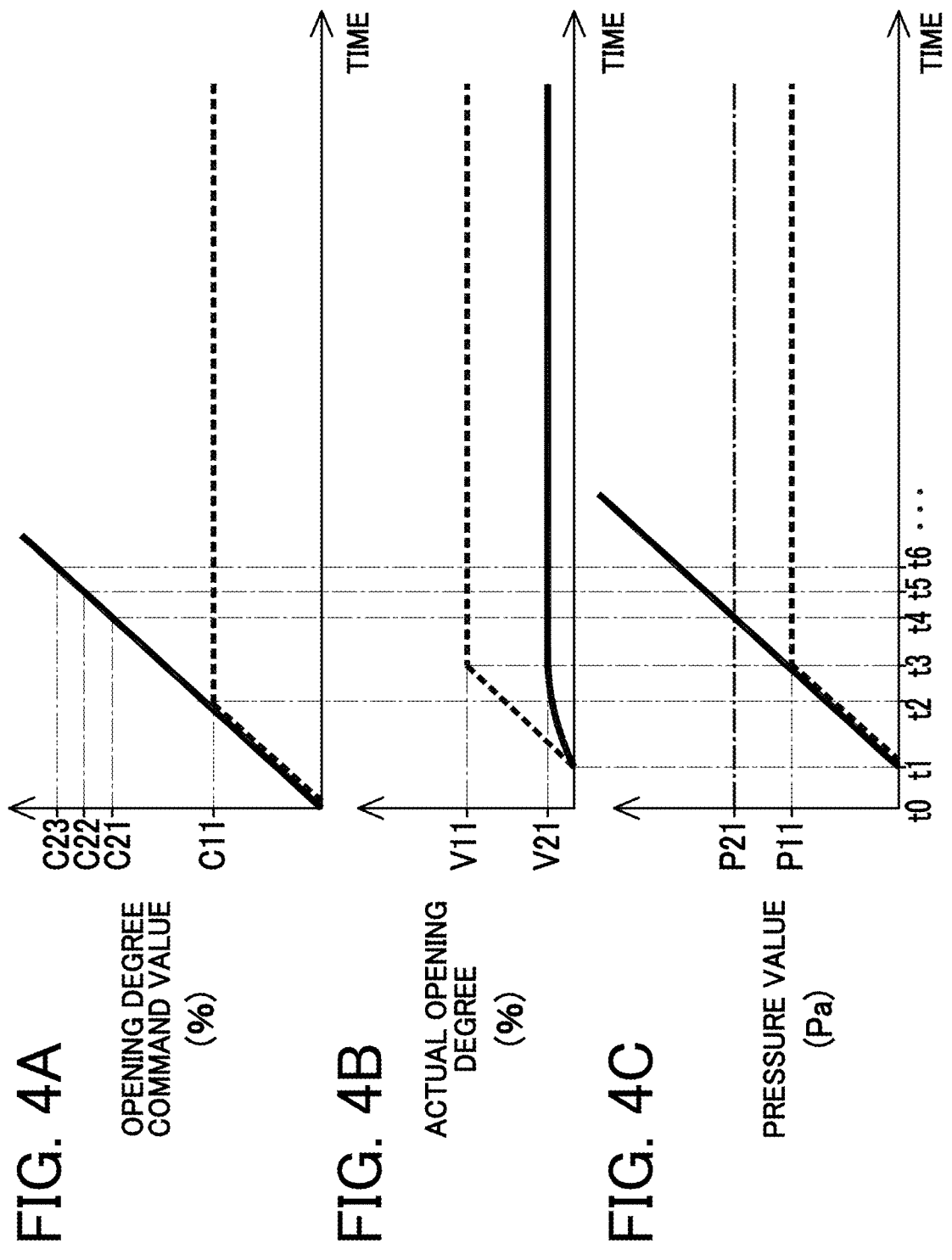
FIG. 4A is a graph showing a relationship between an opening-degree command value outputted by the controller and time.
FIG. 4B is a graph showing a relationship between an actual opening degree of the vacuum open-close valve (a valve element) and time.
FIG. 4C is a graph showing a relationship between a pressure value in a vacuum chamber and time.

Herein, the control of pressure value in the vacuum chamber 11 by the vacuum pressure control system 1 will be described, referring to FIGS. 4A-4C. FIG. 4A is a graph showing the relationship between the opening-degree command value outputted from the controller 70 and time. FIG. 4B is a graph showing the relationship between the actual opening degree of the vacuum open-close valve 30, i.e., the valve element 40, and time. This actual opening degree indicates an actual opening degree of the valve element 40 driven by the opening-degree command value. FIG. 4C is a graph showing the relationship between the pressure value in the vacuum chamber 11 and time. The opening-degree command value and the actual opening degree are expressed numerically from 0 to 100, assuming that the fully-closed position of the valve element 40 is 0% and the fully-open position of the same is 100%. In the graphs of FIGS. 4A, 4B, and 4C, further, solid waveforms represent the operations of the vacuum open-close valve 30, i.e., the valve element 40, with the bellofram 38 damaged, and dashed waveforms represent the normal operations of the vacuum open-close valve 30, i.e., the valve element 40. Herein, damage to the bellofram 38 indicates that the bellofram 38 is torn, making it impossible to keep the pressure chamber 331*b* airtight.

In the embodiment, the target value of the pressure value in the vacuum chamber 11 is assumed as a pressure value P11. Further, the opening degree of the vacuum open-close valve 30 required to obtain this pressure value P11 is assumed as an opening degree V11, and an opening-degree command value outputted by the controller 70 to obtain this opening degree V11 is assumed as a command value C11.

First, the normal operations of the vacuum open-close valve 30, indicated by the dashed waveforms in FIGS. 4A, 4B, and 4C, will be described.

To adjust the pressure value in the vacuum chamber 11 to the pressure value P11 that is the target value, firstly, the controller 70 starts to output the command value C11 (time point t0). This starts supply of compressed air to the pressure chamber 331*b*, and then the valve element 40 of the vacuum open-close valve 30 starts to move with a slight delay from the output of the command value C11. Specifically, the actual opening degree starts to vary (time point t1). Accordingly, the pressure value also starts to vary. When the actual opening degree reaches the opening degree V11 corresponding to the command value C11 (time point t3), the pressure value in the vacuum chamber 11 reaches the target value, the pressure value P11. FIGS. 4A, 4B, and 4C show that, at time point t3, the pressure value reaches the pressure value P11 at the same time when the actual opening degree reaches the opening degree V11. However, not at the same time, the pressure value may reach the pressure value P11 with a delay after the actual opening degree reaches the opening degree V11. After time point t3, the command value C11 is continuously outputted, keeping the actual opening degree at the opening degree V11, and maintaining the pressure value in the vacuum chamber 11 at the target value, i.e., the pressure value P11.

Second, the operations of the vacuum open-close valve 30 with the damaged bellofram 38, indicated by the solid waveforms in FIGS. 4A, 4B, and 4C, will be described.

To adjust the pressure value in the vacuum chamber 11 to the pressure value P11 that is the target value, firstly, the controller 70 starts to output the command value C11 (time point t0). This starts supply of compressed air to the pressure chamber 331*b*, and then the valve element 40 of the vacuum open-close valve 30 starts to move with a slight delay from the output of the command value C11. Specifically, the actual opening degree starts to vary (time point t1). However, when the bellofram 38 is damaged, the compressed air leaks from the pressure chamber 331*b* into the atmospheric air chamber 331*a*, and the piston 34 is not moved sufficiently. This actual opening degree remains an opening degree V21 smaller than the opening degree V11 that is the target value (see FIG. 4B). If the opening degree of the vacuum open-close valve 30 is smaller than the target value, the opening-degree command value is increased with time to obtain the opening degree V11 (see FIG. 4A). In contrast, if the opening degree of the vacuum open-close valve 30 is smaller than the target value, the gas in the vacuum chamber 11 is not sufficiently exhausted, and thus the pressure value in the vacuum chamber 11 rises with time (see FIG. 4C).

Abnormality Detection Program

Figure 5:
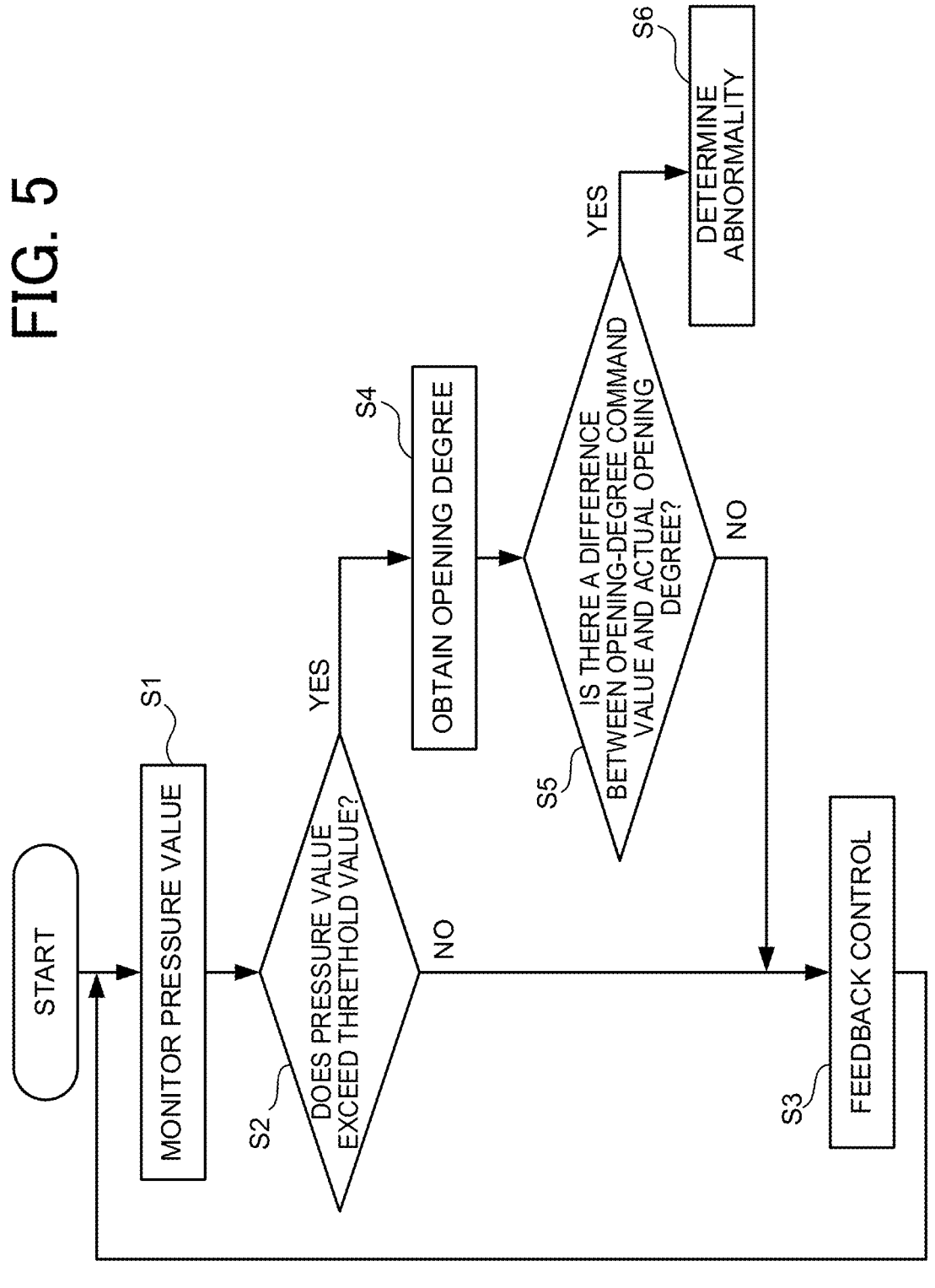
FIG. 5 is a flowchart showing operations of an abnormality detection program.

The abnormality detection program 702*a* can detect that the bellofram 38 is damaged based on the behaviors of graphs in FIGS. 4A to 4C described above. FIG. 5 is a flowchart showing the operations of the abnormality detection program 702*a*. To be specific, this program detects as below.

The vacuum pressure control system 1 starts to execute the pressure control of the vacuum chamber 11 and simultaneously the abnormality detection program 702*a* starts to operate. When the abnormality detection program 702*a* starts running, the controller 70 monitors the pressure value in the vacuum chamber 11 through the pressure sensor 12 (S1 in FIG. 5). Unless the pressure value in the vacuum chamber 11 exceeds a predetermined threshold value, i.e., a second predetermined threshold value (S2: NO), the controller 70 continues feedback control of the vacuum open-close valve 30 (S3).

When the pressure value in the vacuum chamber 11 exceeds the predetermined threshold value, i.e., the second predetermined threshold value (S2: YES), the controller 70 checks the actual opening degree of the vacuum open-close valve 30 through the potentiometer 37 (S4). The predetermined threshold value is preferably obtained by adding a value of 0.2% to 1% of the target value of the pressure value in the vacuum chamber 11 to the target value. In this embodiment, it is a value obtained by adding a value of 0.2% of the target value to the target value. In other words, a pressure value P21 obtained by adding a 0.2% value of the pressure value P11 to the pressure value P11 is set as the threshold value. That is, when the pressure value in the vacuum chamber 11 reaches the pressure value P21, the controller 70 checks the actual opening degree of the vacuum open-close valve through the potentiometer 37 (time point t4 in FIG. 4)

Next, the controller 70 calculates an opening degree difference that is a difference between the opening-degree command value outputted by the controller 70 to the vacuum open-close valve 30 and the actual opening degree (the value checked in S4) of the valve element 40 driven by the opening-degree command value and monitors the opening degree difference (S5). This calculation is performed at intervals of 1 second (for example, at time point t4, t5, t6, . . . in FIG. 4). Specifically, at time point t4, a difference between an opening-degree command value C21 at time point t4 and an opening degree V21 at time point t4 is calculated. At time point t5, a difference between an opening-degree command value C22 at time point t5 and an opening degree V21 at time point t5 is calculated. At time point t6, a difference between an opening-degree command value C23 at time point t6 and an opening degree V21 at time point t6 is calculated. Further, in a numerical example, when the actual opening degree is 3% for an opening-degree command value indicating a 7% opening degree, the opening-degree difference is 4%.

When the opening-degree difference calculated at 1-second intervals as above is a threshold value of 1% (which is one example of the first predetermined threshold value) or more for three consecutive times (S5: YES), determining that the bellofram 38 of the vacuum open-close valve 30 is damaged, an alarm is issued (S6). Specifically, when the opening-degree difference calculated at time point t4 is 1% or more, the opening-degree difference calculated at time point t5 is 1% or more, and the opening-degree difference calculated at time point t6 is 1% or more, the bellofram 38 of the vacuum open-close valve 30 is determined to be damaged. Further, in one numerical example, the opening-degree difference is 4% when the actual opening degree is 3% for an opening-degree command value indicating a 7% opening degree, so that the opening-degree difference is determined to be 1% or more. When the opening-degree difference of 1% or more is calculated for three consecutive times as above, the bellofram 38 is determined to be damaged and an alarm is issued. The foregoing threshold value is desirably set in a range of 0.5% to 2.0%. The above set value of 1% is merely one example.

In contrast, except when the opening-degree difference calculated at 1-second intervals is 1% or more for three consecutive times (S5: NO), the controller 70 continues the feedback control of the vacuum open-close valve 30 (S3).

Operations and Effects

As described above, the vacuum pressure control system 1 in the present embodiment is configured as below.

(1) The vacuum pressure control system 1 includes the vacuum open-close valve 30 placed between the vacuum chamber 11 and the vacuum pump 15 for exhausting gas from the vacuum chamber 11, and provided with the valve element 40 and the valve seat 45 which the valve element 40 contacts with or separates from, the vacuum open-close valve 30 being configured to control a pressure value in the vacuum chamber 11 by adjusting the opening degree of the valve element 40, and the controller 70 configured to output an opening-degree command value to the vacuum open-close valve 30 to command the opening degree required to adjust the pressure value to the target value. The vacuum open-close valve 30 includes the drive unit 31 that provides driving force to the valve element 40 based on the opening-degree command value. The drive unit 31 includes the drive shaft 39 connected to the valve element 40, the piston 34 connected to the drive shaft 39 on an opposite side from the valve element 40, the cylinder 33 provided with the piston chamber 331 that houses the piston 34, and the bellofram 38 that is retained by the piston 34 to partition the piston chamber 331. The controller 70 is provided with the abnormality detection program 702*a* configured to calculate an opening-degree difference between the opening-degree command value outputted to the vacuum open-close valve 30 and the actual opening degree of the valve element 40 driven by the opening-degree command value, and determine that the bellofram 38 is damaged when the opening-degree difference is the first predetermined threshold value or more. Here, damage to the bellofram 38 indicates, for example, that the bellofram 38 is torn, making it impossible to keep the piston chamber 331 (i.e., the pressure chamber 331*b*) airtight.

The inventors of the present application focused on that, if the bellofram 38 is damaged, which cannot keep the airtightness of the piston chamber 331 (i.e., the pressure chamber 331*b*), the piston 34 is not moved sufficiently and thus the actual opening degree is apt to be smaller than the target opening degree, i.e., the opening degree indicated by the opening-degree command value. Consequently, the inventors experimentally confirmed that whether or not the bellofram 38 is damaged can be determined by calculating an opening degree difference between the opening-degree command value and the actual opening degree, and monitoring the opening degree difference. To be specific, it is possible to determine that the bellofram 38 is damaged when the opening-degree difference is the predetermined threshold value or more. Thus, according to the vacuum pressure control system 1 described in (1), the controller 70 is provided with the abnormality detection program 702*a* configured to calculate the opening-degree difference between the opening-degree command value outputted to the vacuum open-close valve 30 and the actual opening degree of the valve element 40 driven by the opening-degree command value, and determine that the bellofram 38 is damaged when the opening-degree difference is the first predetermined threshold value or more. This configuration can detect the damage to the bellofram 38 used in the vacuum open-close valve 30.

(2) In the vacuum pressure control system 1 described in (1), the first predetermined threshold value may be set in a range of 0.5% to 2.0%.

The inventors experimentally confirmed that, when the first predetermined threshold value is set in a range of 0.5% or more but 2.0% or less, it is possible to detect damage to the bellofram more reliably. This is because setting the first predetermined threshold value smaller than 0.5% results in more false detections, while setting the first predetermined threshold value larger than 2.0% results in delayed detection of the bellofram damage.

(3) In the vacuum pressure control system 1 described in (1) or (2), the abnormality detection program 702a may be configured to calculate the opening-degree difference at intervals of 1 second, and determine that the bellofram 38 is damaged when the opening-degree difference is the first predetermined threshold value or more for three or more consecutive times.

In the vacuum open-close valve 30, if hunting occurs, which causes fluctuations in the opening degree of the valve element 40, the difference between the opening-degree command value and the actual opening degree may become suddenly large. If the bellofram 38 is determined to be damaged in every case where the opening-degree difference is the first predetermined threshold value or more, this may result in false detection that the bellofram 38 is damaged, even if this bellofram 38 is not actually damaged. According to the vacuum pressure control system 1 described in (3), while comparing between the opening-degree command value and the actual opening degree at 1-second intervals, the bellofram 38 is determined to be damaged when the difference is equal to or larger than the first predetermined threshold value for three or more consecutive times, which can avoid false detection. This condition "three or more consecutive times" is set because the condition "two consecutive times" may cause false detection due to hunting.

(4) In the vacuum pressure control system 1 described in any one of (1) to (3), the abnormality detection program 702a may calculate the opening-degree difference when the pressure value in the vacuum chamber 11 exceeds a second predetermined threshold value.

(5) In the vacuum pressure control system 1 described in (4), the second predetermined threshold value may be obtained by adding a value of 0.2% to 1% of the target value to the target value.

In the vacuum open-close valve 30, if hunting occurs, which causes fluctuations in the opening degree of the valve element 40, the difference between the opening-degree command value and the actual opening degree may become suddenly large. If the bellofram 38 is determined to be damaged in every case where the opening-degree difference is the first predetermined threshold value or more, this may result in false detection that the bellofram 38 is damaged, even if this bellofram 38 is not actually damaged. Then, the inventors focused on that if the bellofram 38 is damaged and the actual opening degree is smaller than the target value, i.e., the opening degree indicated by the opening-degree command value, gas exhaust from the vacuum chamber is not sufficiently performed, and the pressure value in the vacuum chamber 11 rises with time. The inventors therefore experimentally confirmed that false detection can be suppressed by starting the calculation of the opening-degree difference when the pressure value in the vacuum chamber 11 exceeds the second predetermined threshold value. This second predetermined threshold value is obtained for example by adding a value of 0.2% or larger but 1% or less of the target value to the target value. This setting "0.2% to 1%" is because a threshold value obtained by adding a value smaller than 0.2% of the target value to the target value cannot reliably prevent false detection, while a threshold value obtained by adding a value larger than 1% of the target value to the target value cannot quickly detect the bellofram damage.

The foregoing embodiments are mere examples and give no limitation to the present disclosure. The present disclosure may be embodied in other specific forms without departing from the essential characteristics thereof. For instance, the bellofram 38 in the foregoing embodiment is made of a base fabric coated with fluorine-contained rubber (e.g., FKM) by integral molding, but may be made of rubber alone, not including a base fabric.

REFERENCE SIGNS LIST

1 Vacuum pressure control system
11 Vacuum chamber
15 Vacuum pump
30 Vacuum open-close valve
31 Drive unit
33 Cylinder
34 Piston
38 Bellofram
39 Drive shaft
40 Valve element
70 Controller
331 Piston chamber
702a Abnormality detection program

What is claimed is:

1. A vacuum pressure control system comprising:
a vacuum open-close valve placed between a vacuum chamber and a vacuum pump for exhausting gas from the vacuum chamber, and provided with a valve element and a valve seat which the valve element contacts with or separates from, the vacuum open-close valve being configured to control a pressure value in the vacuum chamber by adjusting an opening degree of the valve element; and
a controller configured to output an opening-degree command value to the vacuum open-close valve to command the opening degree required to adjust the pressure value to a target value,
wherein the vacuum open-close valve includes a drive unit that provides driving force to the valve element based on the opening-degree command value,
the drive unit includes:
a drive shaft connected to the valve element;
a piston connected to the drive shaft on an opposite side from the valve element;
a cylinder provided with a piston chamber in which the piston is housed; and
a bellofram that is retained by the piston to partition the piston chamber,
the controller is provided with an abnormality detection program configured to:
calculate an opening degree difference, which is a difference between the opening-degree command value outputted to the vacuum open-close valve and an actual opening degree of the valve element driven by the opening-degree command value; and
determine that the bellofram is damaged when the opening-degree difference is a first predetermined threshold value or more, and
the abnormality detection program is configured to determine that the bellofram is damaged when the opening degree difference is the first predetermined threshold value or more for three or more consecutive times.

2. The vacuum pressure control system according to claim 1, wherein the first predetermined threshold value is set in a range of 0.5% to 2.0%.

3. The vacuum pressure control system according to claim 2, wherein the abnormality detection program calculates the opening degree difference when the pressure value in the vacuum chamber exceeds a second predetermined threshold value.

4. The vacuum pressure control system according to claim 3, wherein the second predetermined threshold value is obtained by adding a value of 0.2% to 1% of the target value to the target value.

5. The vacuum pressure control system according to claim 1, wherein the abnormality detection program calculates the opening degree difference when the pressure value in the vacuum chamber exceeds a second predetermined threshold value.

6. The vacuum pressure control system according to claim 5, wherein the second predetermined threshold value is obtained by adding a value of 0.2% to 1% of the target value to the target value.

7. A vacuum pressure control system comprising:
a vacuum open-close valve placed between a vacuum chamber and a vacuum pump for exhausting gas from the vacuum chamber, and provided with a valve element and a valve seat which the valve element contacts with or separates from, the vacuum open-close valve being configured to control a pressure value in the vacuum chamber by adjusting an opening degree of the valve element; and
a controller configured to output an opening-degree command value to the vacuum open-close valve to command the opening degree required to adjust the pressure value to a target value,
wherein the vacuum open-close valve includes a drive unit that provides driving force to the valve element based on the opening-degree command value,
the drive unit includes:
a drive shaft connected to the valve element;
a piston connected to the drive shaft on an opposite side from the valve element;
a cylinder provided with a piston chamber in which the piston is housed; and
a bellofram that is retained by the piston to partition the piston chamber,
the controller is provided with an abnormality detection program configured to:
calculate an opening degree difference, which is a difference between the opening-degree command value outputted to the vacuum open-close valve and an actual opening degree of the valve element driven by the opening-degree command value; and
determine that the bellofram is damaged when the opening-degree difference is a first predetermined threshold value or more,
the abnormality detection program is configured to:
calculate the opening degree difference at intervals of 1 second; and
determine that the bellofram is damaged when the opening degree difference is the first predetermined threshold value or more for three or more consecutive times.

8. The vacuum pressure control system according to claim 7, wherein the abnormality detection program calculates the opening degree difference when the pressure value in the vacuum chamber exceeds a second predetermined threshold value.

9. The vacuum pressure control system according to claim 8, wherein the second predetermined threshold value is obtained by adding a value of 0.2% to 1% of the target value to the target value.

10. A vacuum pressure control system comprising:
a vacuum open-close valve placed between a vacuum chamber and a vacuum pump for exhausting gas from the vacuum chamber, and provided with a valve element and a valve seat which the valve element contacts with or separates from, the vacuum open-close valve being configured to control a pressure value in the vacuum chamber by adjusting an opening degree of the valve element; and
a controller configured to output an opening-degree command value to the vacuum open-close valve to command the opening degree required to adjust the pressure value to a target value,
wherein the vacuum open-close valve includes a drive unit that provides driving force to the valve element based on the opening-degree command value,
the drive unit includes:
a drive shaft connected to the valve element;
a piston connected to the drive shaft on an opposite side from the valve element;
a cylinder provided with a piston chamber in which the piston is housed; and
a bellofram that is retained by the piston to partition the piston chamber,
the controller is provided with an abnormality detection program configured to:
calculate an opening degree difference, which is a difference between the opening-degree command value outputted to the vacuum open-close valve and an actual opening degree of the valve element driven by the opening-degree command value; and
determine that the bellofram is damaged when the opening-degree difference is a first predetermined threshold value or more,
the first predetermined threshold value is set in a range of 0.5% to 2.0%,
the abnormality detection program is configured to:
calculate the opening degree difference at intervals of 1 second; and
determine that the bellofram is damaged when the opening degree difference is the first predetermined threshold value or more for three or more consecutive times.

11. The vacuum pressure control system according to claim 10, wherein the abnormality detection program calculates the opening degree difference when the pressure value in the vacuum chamber exceeds a second predetermined threshold value.

12. The vacuum pressure control system according to claim 11, wherein the second predetermined threshold value is obtained by adding a value of 0.2% to 1% of the target value to the target value.

* * * * *